(12) United States Patent
Mueller et al.

(10) Patent No.: US 10,118,805 B2
(45) Date of Patent: Nov. 6, 2018

(54) BATTERY GRIPPER

(71) Applicant: J. Schmalz GmbH, Glatten (DE)

(72) Inventors: Benedikt Mueller, Horb-Dettlingen (DE); Andreas Steinbach, Dornstetten (DE); Norman Paul, Freudenstadt (DE)

(73) Assignee: J. Schmalz GmbH, Glatten (DE)

( * ) Notice: Subject to any disclaimer, the term of this patent is extended or adjusted under 35 U.S.C. 154(b) by 0 days.

(21) Appl. No.: 15/516,703

(22) PCT Filed: Oct. 13, 2014

(86) PCT No.: PCT/EP2014/071912
§ 371 (c)(1),
(2) Date: Apr. 4, 2017

(87) PCT Pub. No.: WO2016/058629
PCT Pub. Date: Apr. 21, 2016

(65) Prior Publication Data
US 2017/0297875 A1    Oct. 19, 2017

(51) Int. Cl.
*B66C 1/02* (2006.01)
*B25J 15/06* (2006.01)

(52) U.S. Cl.
CPC ............ *B66C 1/025* (2013.01); *B66C 1/0231* (2013.01); *B66C 1/0287* (2013.01); *B25J 15/0683* (2013.01)

(58) Field of Classification Search
CPC ............... B25J 15/0033; B25J 15/0616; B25J 15/0683; B25J 15/0691; B66C 1/02;
(Continued)

(56) References Cited

U.S. PATENT DOCUMENTS

| 4,412,775 A * | 11/1983 | Molitor ................. B66C 1/0212 414/626 |
| 4,828,304 A * | 5/1989 | No ........................ B25J 15/0616 294/106 |

(Continued)

FOREIGN PATENT DOCUMENTS

| CA | 2093531 | 3/1993 |
| CN | 103406911 | 11/2013 |

(Continued)

OTHER PUBLICATIONS

International Search Report and Written Opinion Form PCT/ISA/220, International Application No. PCT/EP2014/071912, p. 1-3, International Filing Date Oct. 13, 2014, dated Aug. 26, 2015.

*Primary Examiner* — Dean J Kramer
(74) *Attorney, Agent, or Firm* — Bond Schoeneck & King, PLLC; George McGuire

(57) ABSTRACT

Battery gripper (12), for attracting by suction and handling starter batteries (26) of, in particular, motor vehicles, having a housing (56), in which a vacuum chamber which can be loaded with vacuum is provided and which has suction openings (84, 84) on the suction side thereof (54) which faces the starter battery to be attracted by suction, wherein the suction side is assigned a flexible lining (82) for contact with the starter battery, wherein the housing has a T-shaped cross section which runs parallel to the suction side, wherein the cross section has a bar section (64) and a web section (66) which extends transversely from the bar section, in such a way that the web section extends between the battery poles (68, 70) of the starter battery when the starter battery is attracted by suction to the battery gripper.

13 Claims, 8 Drawing Sheets

(58) Field of Classification Search
CPC ..... B66C 1/025; B66C 1/0231; B66C 1/0281; B66C 1/0287
USPC .......................................... 294/183, 188, 65
See application file for complete search history.

(56) References Cited

U.S. PATENT DOCUMENTS

| | | | | |
|---|---|---|---|---|
| 4,925,225 A * | 5/1990 | Dost | ..................... | B66C 1/0287 294/186 |
| 4,931,341 A * | 6/1990 | Haffer | ..................... | B65G 47/91 209/905 |
| 5,088,878 A * | 2/1992 | Focke | ..................... | B65G 47/91 294/188 |
| 5,125,706 A * | 6/1992 | Kuwaki | ............... | B65G 47/917 294/119.1 |
| 5,609,377 A * | 3/1997 | Tanaka | ................ | B65G 47/918 294/65 |
| 5,707,094 A | 1/1998 | Gower | | |
| 5,752,729 A * | 5/1998 | Crozier | ................ | B25B 11/007 294/188 |
| 2007/0200378 A1* | 8/2007 | Johnson | ................ | B66C 1/0256 294/65 |
| 2015/0352796 A1* | 12/2015 | Eisele | ..................... | B29C 70/54 264/320 |

FOREIGN PATENT DOCUMENTS

| | | |
|---|---|---|
| CN | 103481289 | 1/2014 |
| DE | 102011006271 | 10/2012 |
| JP | S591185 | 4/1979 |

* cited by examiner

BATTERY GRIPPER

CROSS-REFERENCE TO RELATED APPLICATIONS

This application is the U.S. National Stage filing under 35 U.S.C. 371 of international application number PCT/EP2014/071912 filed on Oct. 13, 2014, the entire disclosure of which is incorporated herein by reference.

BACKGROUND OF THE INVENTION

The invention relates to a battery gripper for picking up by suction and handling starter batteries, in particular for picking up by suction and handling starter batteries of motor vehicles. The invention also relates to a gripping system comprising a tube lifter, an operating device for a tube lifter, at least a first vacuum source and a battery gripper of this kind.

Conventionally, vacuum grippers comprise a housing in which a vacuum chamber to which a vacuum can be applied is provided, the housing comprising, on the suction side thereof that faces the workpiece, suction openings having a suction cross section, the suction side being associated with a flexible lining which contacts the workpiece.

Vacuum grippers of this kind can be used in particular for grasping or lifting objects, for example stable flat materials, e.g. boards or plates, or smaller objects such as tins, tubs, dishes or the like. The vacuum grippers comprise the flexible lining for this purpose, which lining contacts a top face of the objects to be gripped.

Owing to growing power requirements in motor vehicles and to start-stop systems which are becoming increasingly widespread, starter batteries in motor vehicles are becoming ever larger and thus also heavier. Therefore people replacing or moving starter batteries in car manufacturing or industries closely related to cars are also facing increasing physical strain.

Owing to the structure thereof, starter batteries are very compact and are therefore often heavy. Moreover, conventionally, the surfaces of starter batteries do not have a continuously smooth outer contour, and therefore interference contours make it more difficult to pick up by suction or grip starter batteries.

In general, starter batteries are stored on pallets or in boxes, said batteries being packed tightly together meaning that a grip can only be formed in spaces between starter batteries with difficulty. Therefore, up to now, starter batteries have been moved manually by means of a hook or claw such that it is possible to grip the starter batteries by the side of the battery. For this purpose, however, it is first necessary to shift the starter batteries out of position by hand.

SUMMARY OF THE INVENTION

The object of the invention is therefore that of providing a battery gripper which makes it possible to pick up by suction a starter battery of a motor vehicle by the top face of said battery, it being intended for the battery gripper to be simple to produce, and it being intended for the starter batteries to be gripped in a reliable and secure manner.

This object is achieved by a battery gripper having the features of claim 1. A battery gripper of this kind for picking up by suction and handling starter batteries, in particular of motor vehicles, comprises a housing in which a vacuum chamber to which a vacuum can be applied is provided and which comprises suction openings on the suction side thereof that faces the starter battery to be picked up by suction, the suction side being associated with a flexible lining for contacting the starter battery, the suction side and/or the flexible lining having a T-shaped cross section, the cross section having a bar section and a web section which extends transversely to said bar section such that the web section extends between the battery poles of the starter battery when said starter battery is picked up by suction on the battery gripper. This is particularly advantageous because, when the battery gripper is put into position, it is possible to prevent the battery poles of the starter battery to be handled from being contacted simultaneously. This advantageously prevents short-circuiting. In this case, it is conceivable for only the suction side and/or the flexible lining to have a T-shaped cross section, it also being possible for the entire housing of the battery gripper to have a T-shaped cross section that extends in parallel with the suction side.

It is also possible for a skirt and/or a curtain to be provided on the battery gripper so as to create a vacuum seal. In this case, it is particularly preferable for the skirt and/or curtain to be arranged on the lateral face of the battery gripper and to extend towards a starter battery that is to be picked up by suction and/or handled.

In a first advantageous development of the battery gripper, the suction openings are designed such that the number, opening cross section and/or geometry thereof is adapted to a battery surface of a starter battery to be picked up by suction. In this case, it is particularly preferable for the number, opening cross section and/or geometry to be selected so as to be adapted to the likelihood of leakage on the top face of the battery to be picked up by suction. If leakage is likely to occur, i.e. in uneven regions on the top face of the battery, it is advantageous if a low number of suction openings having a smaller opening cross section are provided, whereas, in regions in which leakage is unlikely to occur, i.e. in flat regions, a larger number of suction openings having a larger opening cross section can be provided.

It is also advantageous if suction openings are provided with at least two different opening cross sections, a first opening cross section being smaller than a second opening cross section. In this case, the suction openings are preferably arranged such that, in the region of an uneven battery top face, suction openings having the first opening cross section are preferably provided, whereas, in the region of a flat or almost flat battery top face, suction openings having the second opening cross section are preferably provided. The opening cross sections, or diameter, and the arrangement, or position, of the suction openings are advantageously selected so as to be adapted to the likelihood of leakage on the top face of the battery to be picked up by suction. If leakage is likely to occur, i.e. in uneven regions on the top face of the battery, it is advantageous if a low number of suction openings having the first opening cross section are provided, whereas, in regions in which leakage is unlikely to occur, i.e. in flat regions, a larger number of suction openings having the second opening cross section can be provided.

In this case, it is particularly preferable if the suction side has three suction sections in the direction of the bar section, there being arranged in a middle suction section approximately the same number of suction openings having the first and the second opening cross section, and there being arranged in two end suction sections arranged outside the middle suction section only or predominantly suction openings having the second opening cross section. In this case, there being predominantly suction openings having the second opening cross section is to be understood as over 80% of the suction openings in the relevant suction section being suction openings having the second opening cross section.

In a particularly advantageous development of the battery gripper, the middle suction section has a central suction section, there being arranged in the central suction section only suction openings having the first opening cross section, and the middle suction section having, next to the central suction section, two transition suction sections which adjoin the end suction sections, there being arranged in the transition suction sections only or predominantly suction openings having the second opening cross section. In this case, there being predominantly suction openings having the second opening cross section is to be understood as over 80% of the suction openings in the relevant suction section being suction openings having the second opening cross section.

It is also advantageous if the suction side has a peripheral edge suction section, there being arranged in the edge suction section only or predominantly suction openings having the first opening cross section. In this case, there being predominantly suction openings having the first opening cross section is to be understood as over 80% of the suction openings in the relevant suction section being suction openings having the first opening cross section.

In a further advantageous embodiment of the battery gripper, cylindrical recesses are provided in the flexible lining, which pass through the flexible lining, the suction openings leading into the recesses, and the size of the recesses corresponding to the size of the suction openings.

In this case, it is particularly preferable for the recesses to be designed such that the number, base, geometry and/or depth thereof is adapted to a battery surface of a starter battery to be picked up by suction. In this case, it is particularly preferable for the number, base, geometry and/or depth to be selected so as to be adapted to the likelihood of leakage on the top face of the battery to be picked up by suction. If leakage is likely to occur, i.e. in uneven regions on the top face of the battery, it is advantageous if a low number of recesses having a smaller base are provided, whereas, in regions in which leakage is unlikely to occur, i.e. in flat regions, a larger number of recesses having a larger base can be provided.

Suction openings having a larger opening cross section advantageously lead into recesses having a larger recess cross section or a larger base, and suction openings having a smaller opening cross section advantageously lead into recesses having a smaller recess cross section or a smaller base. The cylindrical recesses advantageously extend perpendicularly to the suction side. Providing the recesses in the flexible lining is particularly advantageous because the recesses can act as chambers having a vacuum effect.

It is also advantageous if the cylindrical recesses have a circular or oblong base. In the case of recesses having an oblong base, it is particularly preferable for two suction openings having the second opening cross section to be assigned to each oblong base or each recess. It is also particularly preferable in this case for the suction openings to be arranged, respectively, in the semicircular end regions of the oblong base. The oblong base is advantageously larger than the circular base, and therefore recesses having an oblong base have a larger recess cross section than recesses having a circular base. In the case of recesses having a circular base, one suction opening is preferably arranged coaxially with the circular base, which suction opening has the first opening cross section.

In a further advantageous embodiment of the battery gripper, the battery gripper has a coupling section for connection to a tube lifter, the coupling section comprising an opening which leads into the vacuum chamber, and the coupling section comprising lock studs arranged evenly around the opening.

Providing a coupling section of this kind makes it possible to connect the battery gripper to a tube lifter or to an operating device for a tube lifter. It is particularly preferable for it to be possible to connect the battery gripper to an operating device for a tube lifter, the operating device preferably comprising a pistol grip and it being possible to connect said operating device to the battery gripper by means of the coupling section. In order to couple the battery gripper to an operating device for a tube lifter, the lock studs can engage in receiving openings in the operating device in the manner of a bayonet fitting. It is made possible to operate the battery gripper using one hand by means of the pistol grip.

It is also particularly preferable for the opening to be arranged in the side facing away from the suction side, the central longitudinal axis of the opening preferably extending perpendicularly to the suction side through the centre of gravity of the battery gripper. The opening makes it possible to connect a vacuum source to the battery gripper. In this case, it is conceivable for it to be possible to use the natural vacuum or the vacuum source of the tube lifter as the vacuum source for the battery gripper.

In a particularly preferable development of the battery gripper, the flexible lining is a foam lining.

Providing a foam lining as the flexible lining has been proven advantageous because foam is both particularly inexpensive and particularly suitable for the present purpose, since it conforms effectively to the sometimes uneven top face of the battery. It is however also conceivable to use a different type of flexible lining instead of a foam lining, for example any type of elastomer.

In a further advantageous embodiment of the battery gripper, the housing has, on the side thereof that faces away from the suction side, a pole marker for a positive pole of a starter battery to be picked up by suction. The pole marker for the positive pole side is advantageously red, whereas a pole marker for a negative pole side can preferably be blue. Providing a pole marker of this kind for the battery poles makes it possible to simplify the gripping or picking up by suction and handling of a starter battery. On the basis of the pole marker, the operators of a battery gripper can determine from which side of the battery the web section has to be inserted between the battery poles in order to pick up by suction or grip the starter battery.

It is also particularly preferable for the housing to have centre markers on the lateral face thereof in the region of the web section and on the side of the bar section that faces away from the web section. In this case, a lateral face is a peripheral face of the housing that is arranged transversely to the suction side. Providing the centre markers means that the orientation of the battery gripper can be used to position said battery gripper centrally on the battery top face of a starter battery.

It is also advantageous if stop sections which project from the suction side are provided on the lateral face. Providing the stop sections means that a stop can be provided for a starter battery to be handled. In this case, it is particularly preferable for a stop section to be provided on the web section in the region of a gripper centre and for two stop sections which are preferably laterally reversed in relation to a mirror plane of symmetry to be provided eccentrically on the side of the bar section that faces away from the web section.

In a further advantageous embodiment of the battery gripper, a mechanical clamping device for clamping the sides of a starter battery to be handled is provided. This means that an additional gripping or holding option can be provided, it being particularly preferable for clamping by means of the clamping device to occur only after the starter battery has been picked up by suction.

The object mentioned at the outset is also achieved by a gripping system of this kind which comprises a tube lifter, an operating device for a tube lifter, at least a first vacuum source and a battery gripper according to at least one of the preceding claims, the first vacuum source being fluidically connected to the tube lifter. It is however also conceivable to provide a different lifting aid instead of a tube lifter, for example cranes, robots or the like. In this case, a central or decentralised vacuum supply may be provided as the vacuum source. A vacuum source of this kind can be powered electrically, for example in the manner of a pump or fan. Moreover, a pneumatic vacuum source in the form of an ejector is also conceivable. The vacuum source can, for example, be arranged directly on the battery gripper, whereas it is also possible to arrange the vacuum source on the lifting aid and to connect the vacuum source to the battery gripper by means of vacuum tubes provided for this purpose.

In this case, the operating device preferably comprises a mating coupling section for connection to the coupling section of the battery gripper, it being particularly preferable for the mating coupling section to comprise a centering stud which can be inserted into the opening in the coupling section. It is also advantageous if the mating coupling section comprises receiving openings for receiving the lock studs of the coupling section of the battery gripper. As a result of rotation in the manner of a bayonet fitting, heads of the lock studs can be engaged from behind in receiving openings in order to releasably connect the battery gripper to the operating device.

It is particularly preferable for the first vacuum source to be fluidically connected to the battery gripper. The vacuum source, which already supplies a vacuum to the tube lifter, can thus be provided so as to supply a vacuum to the battery gripper.

It is however also conceivable for a second vacuum source to be provided which is fluidically connected to the battery gripper. A vacuum can thus be supplied to the battery gripper in a manner which is completely independent of the supply of a vacuum to the tube lifter.

Further details and advantageous configurations of the invention can be found in the following description, by means of which the embodiment shown in the figures is described and explained in more detail.

BRIEF DESCRIPTION OF THE DRAWING FIGURES

Figure 5:
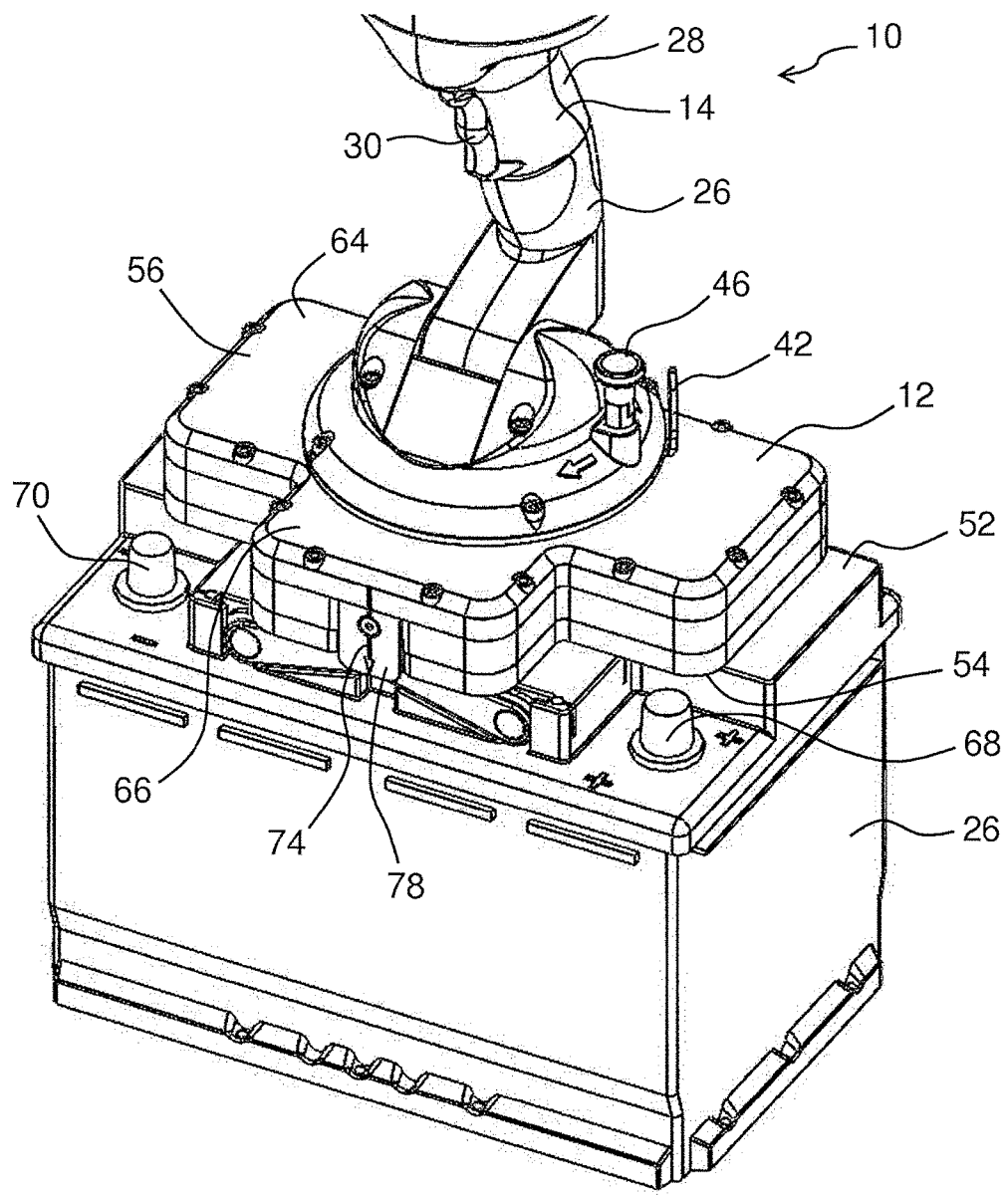
FIG. 5 is a perspective view of the gripping system according to FIGS. 1 and 2, showing a motor vehicle starter battery that has been picked up by suction on the battery gripper.
Figure 6:
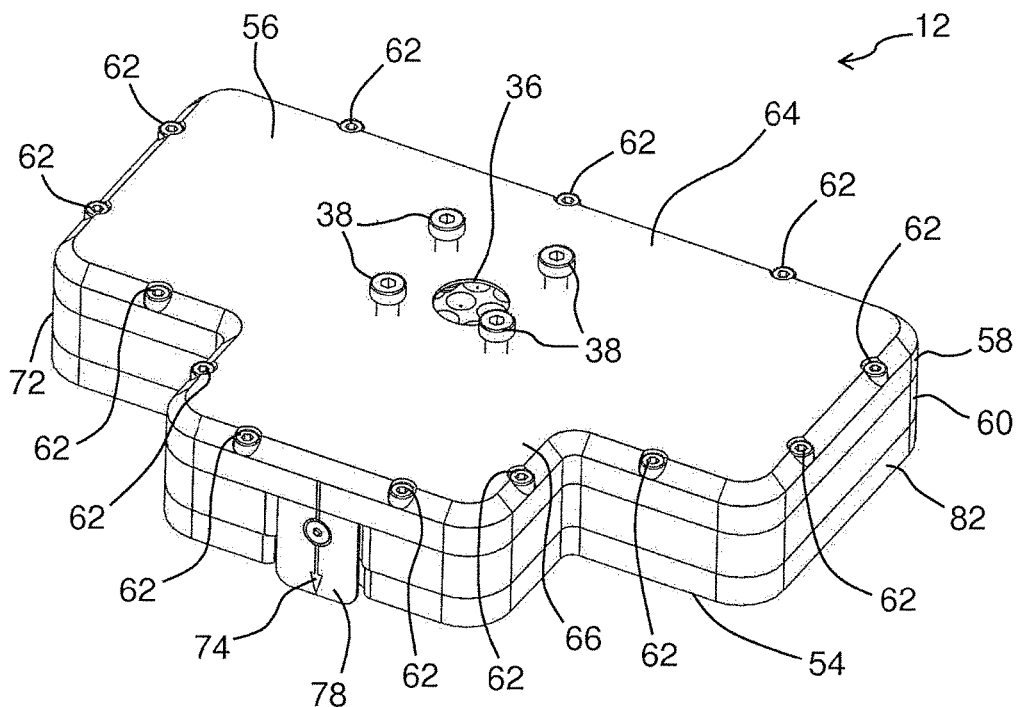
FIG. 6 is a perspective view from above of a battery gripper according to the invention.
Figure 7:
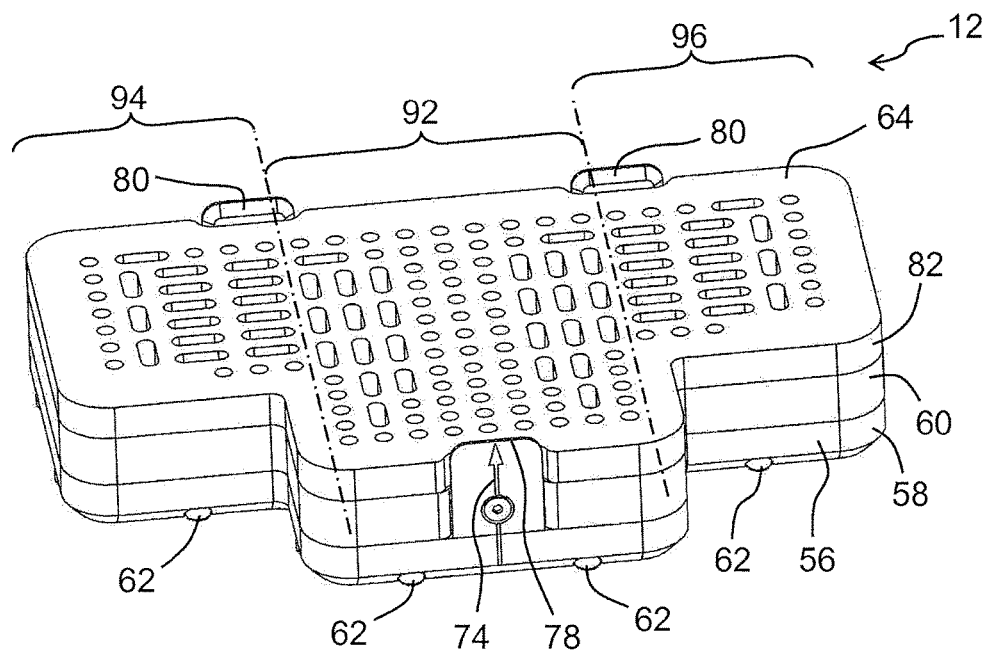
FIG. 7 is a perspective view from below of a battery gripper according to the invention.
Figure 8:
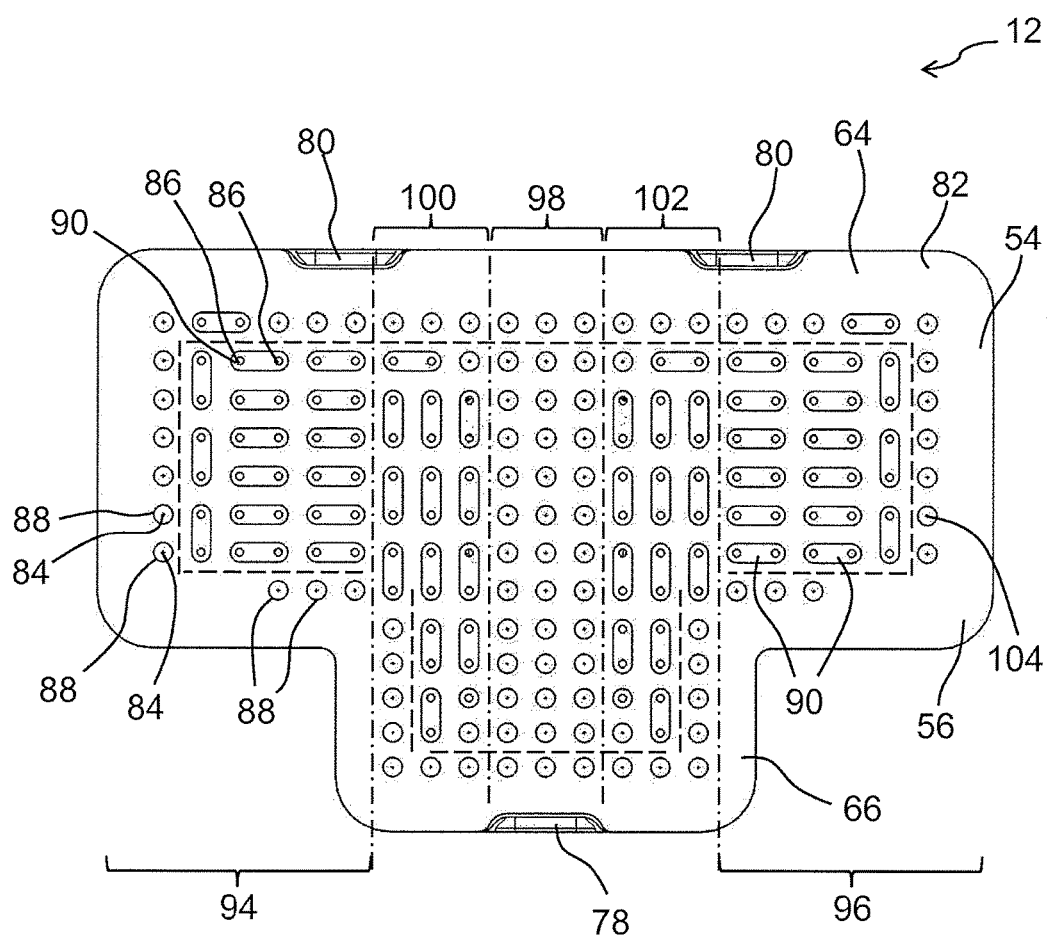
FIG. 8 is a view from below of a battery gripper according to the invention.
Figure 9:
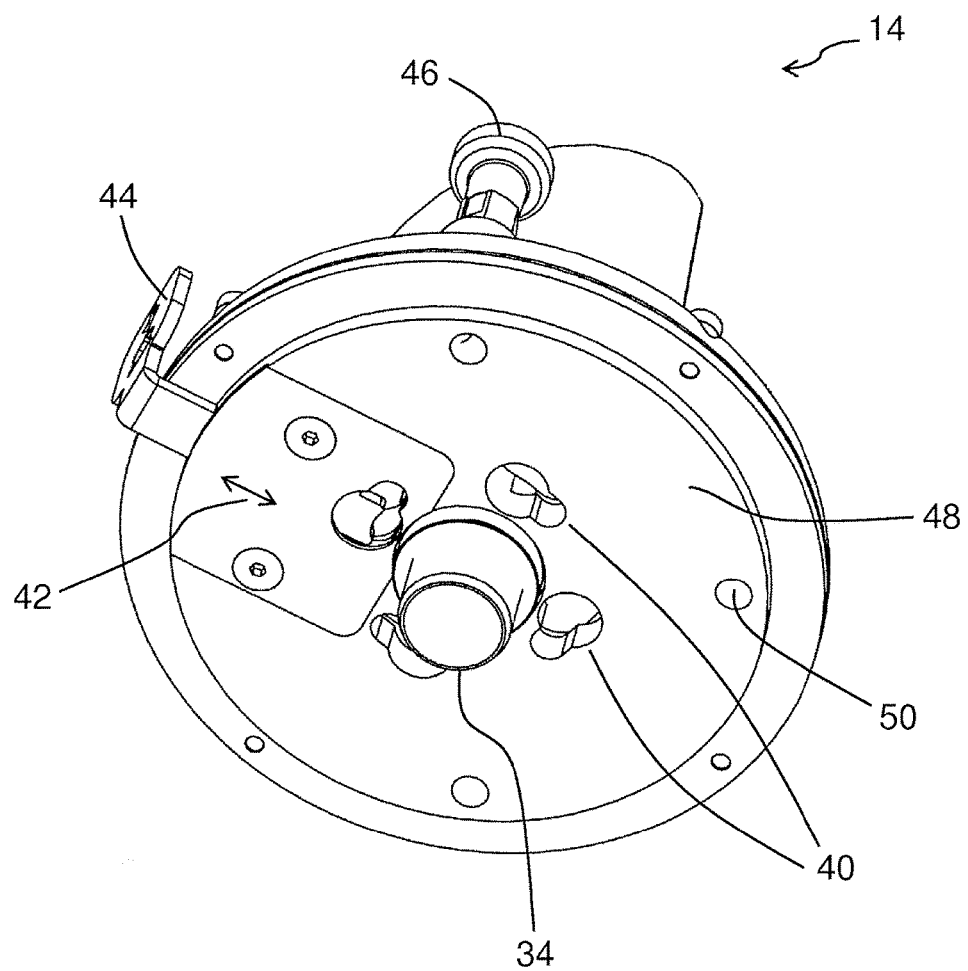
FIG. 9 is a perspective view from below of an operating device of a gripping system according to FIGS. 1 to 5.

FIGS. 1 to 5 show a gripping system 10 comprising a battery gripper 12 according to the invention, FIGS. 6 to 8 showing the battery gripper 12 in isolation. FIG. 9, on the other hand, is a perspective view from below of an operating device 14 of a gripping system 10 according to FIGS. 1 to 5.

DETAILED DESCRIPTION

The manner in which the gripping system 10 and the battery gripper 12 operate is described and explained in overall terms with reference to FIGS. 1 to 9.

Figure 1:
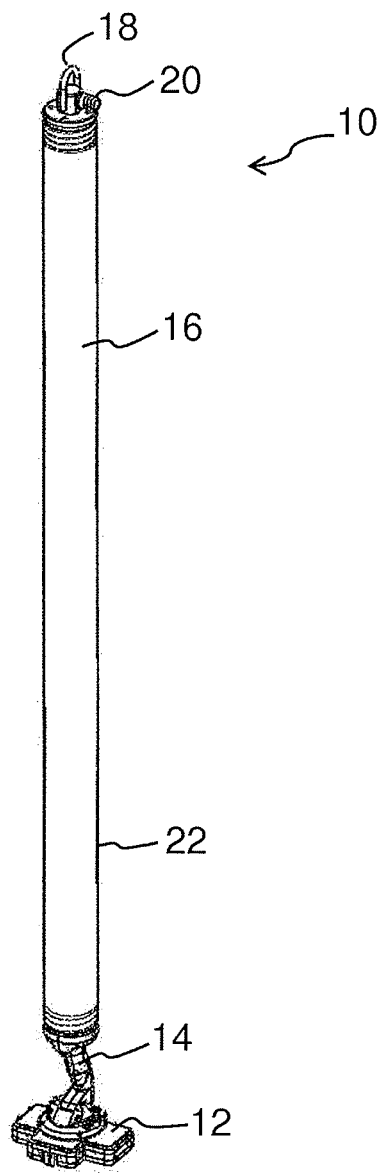
FIG. 1 is a perspective view of a gripping system comprising a battery gripper according to the invention.

FIG. 1 is a perspective view of the gripping system denoted as a whole by reference numeral 10. The gripping system 10 comprises the operating device 14 for a tube lifter 16, it being possible to fasten the tube lifter 16 to a ceiling fitting (not shown) by means of a lug 18. The tube lifter 16 also comprises, in the region of the lug 18, a vacuum connector 20 by means of which the tube lifter 16 can be connected to a vacuum source (not shown in the figures).

Figure 2:
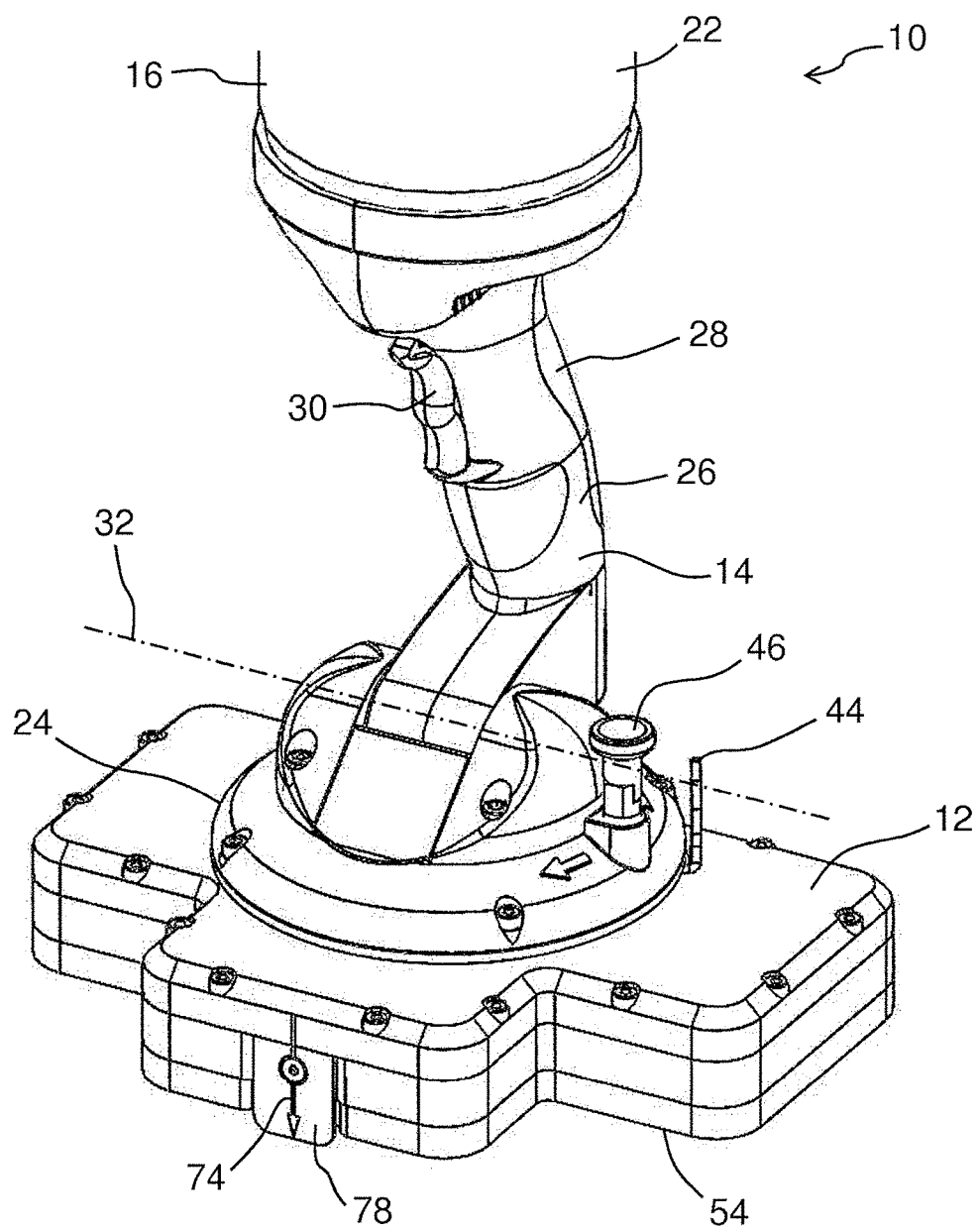
FIG. 2 is an enlarged detail of the gripping system according to FIG. 1.
Figure 3:
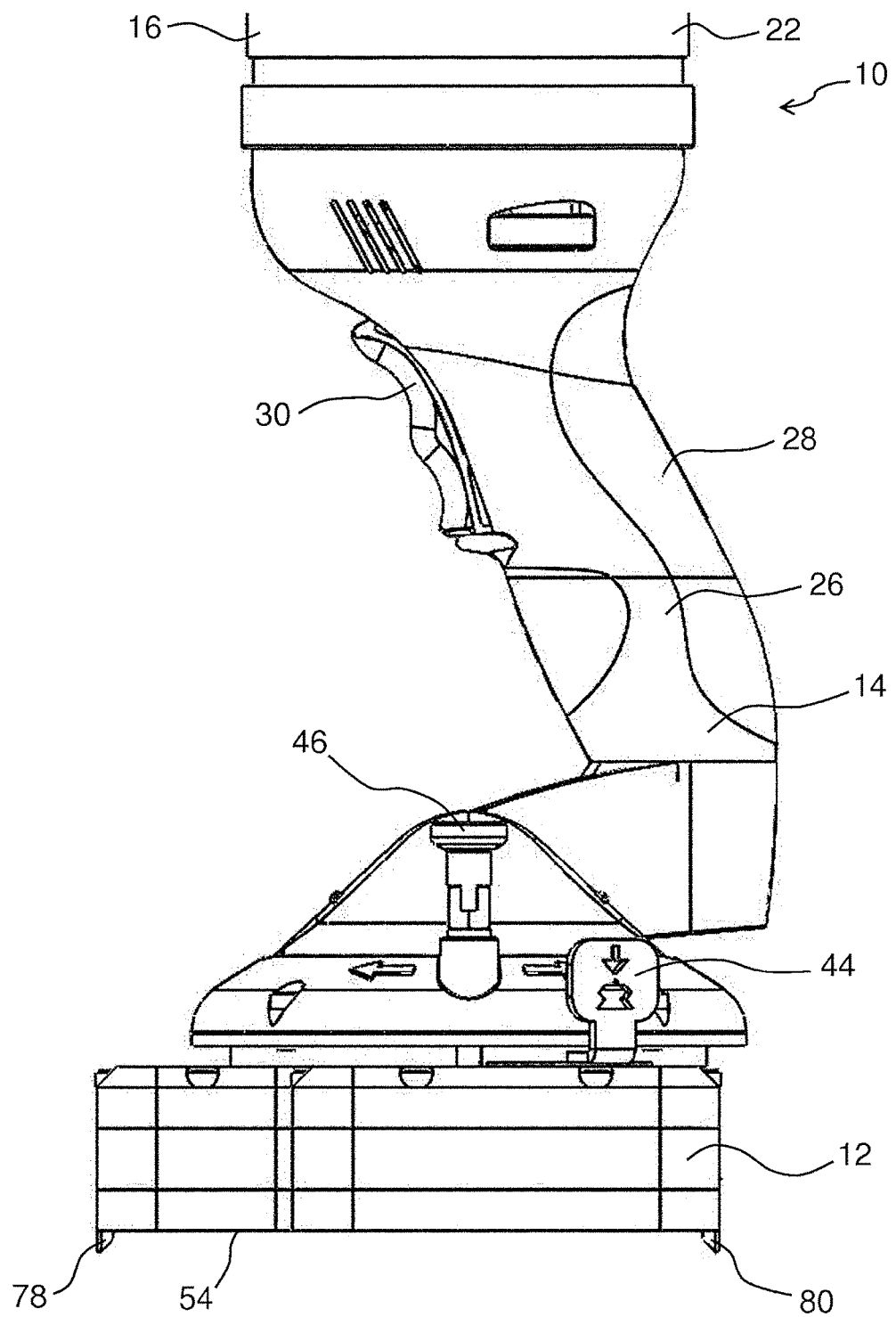
FIG. 3 is a side view of the gripping system according to FIG. 2.
Figure 4:
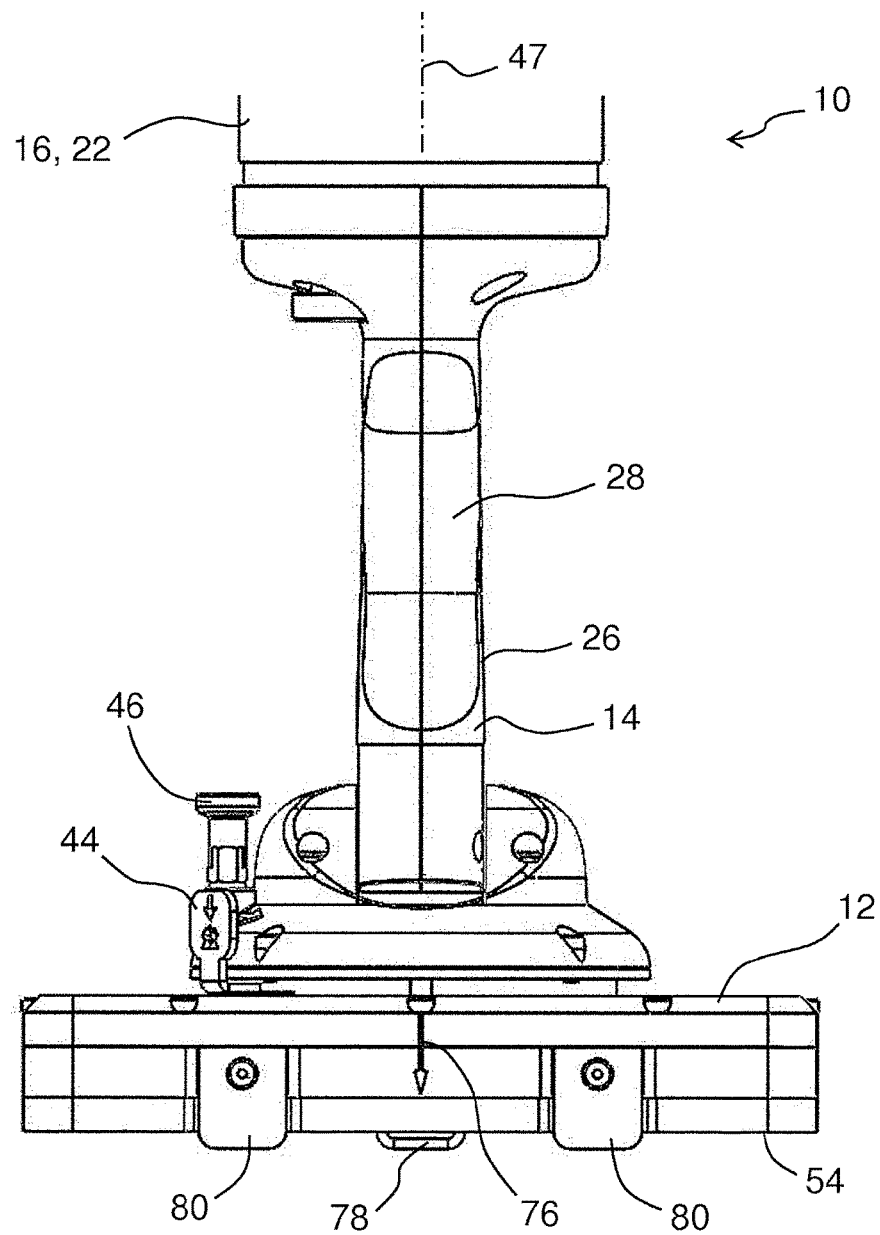
FIG. 4 is a rear view of the gripping system according to FIG. 2.

FIG. 2 is an enlarged detail of the gripping system 10 according to FIG. 1. In this figure, it can clearly be seen that the operating device 14 comprises a connection device for a lift tube 22 of the tube lifter 16. As is generally known, by means of this lift tube 22, the operating device 14 is supplied with a vacuum and is thus raised or lowered by the length of the lift tube 22 decreasing or increasing, respectively. A coupling 24 is located on the underside of the operating device 14, to which coupling the battery gripper 12 is fastened. By means of this battery gripper 12, a motor vehicle starter battery 26, as shown in FIG. 5, can be picked up by suction and grasped such that the starter battery 26 can be raised by the length of the lift tube 22 subsequently decreasing. The portion between the connection device and the coupling 24 is in the form of a pistol grip 26 such that it can be grasped and actuated using one hand, i.e. one-handedly. In this case, the ball of the thumb rests on a rest 28 that can be clipped on and consists of a relatively soft material, e.g. rubber or silicon rubber, such that fatigue-proof operation is possible. A trigger 30 is operated using the index finger, which trigger in turn activates a ventilation vent (not shown in the figures) which is integrated in the pistol grip 26.

The coupling 24 can pivot about a horizontal axis 32 such that the battery gripper 12 can be pivoted about the horizontal axis 32 in order to be placed on a starter battery 26. As can be seen in FIG. 9, the coupling 24 comprises a centering stud 34 which engages in a central opening 36 in the battery gripper 12, which can be seen particularly clearly in FIG. 6. By means of the centering stud 34, a vacuum chamber (not shown in the figures) of the battery gripper 12 can be provided with a vacuum supply. The battery gripper 12 itself has, as can also be seen in FIG. 6, four lock studs 38 which are arranged evenly around the opening 36 and engage in keyhole-like receiving openings 40 in the underside of the coupling 24. The battery gripper 12 rotating in the manner of a bayonet fitting results in the head of one lock stud 38 being engaged in each of the receiving openings 40 from behind. This locking position is secured by a securing plate 42 which can be radially pulled out on a tab 44 counter to a spring force for unlocking purposes. In the radially inner position (locking position), the securing plate 42 engages a receiving opening 40 from behind to a minimal extent such that the head of the lock stud 38 therein cannot be pulled out of the receiving opening 40.

A lock pin 46 can also be seen that can be partially pulled out from the coupling 24 in the direction of a longitudinal axis 47 of the operating device 14 counter to a restoring force. This results in the coupling plate 48 comprising the receiving openings 40 being unlocked such that said plate can be rotated about the longitudinal axis 47. Folding down the partially pulled-out lock pin 46 prevents relocking. Moreover, the locking plate 48 comprises four receiving portions 50 for the lock pin 46 which are arranged evenly over the perimeter of said plate such that four defined rotational positions can be assumed.

The manner in which the battery gripper 12 operates is described and explained in more detail with reference to FIGS. 5 to 8.

As can unquestionably be seen in FIG. 5, a starter battery 26 is picked up by suction on the top face 52 of said battery by means of the battery gripper 12 of the gripping system 10.

For this purpose, the battery gripper 12 comprises a suction side 54 that faces the battery top face 52 of the starter battery 26 to be picked up by suction. The battery gripper 12 also comprises a housing 56, the housing 56 having, as is shown in FIGS. 6 and 7, a housing top part 58 and a housing bottom part 60, the suction side 54 being arranged on the housing bottom part 60 side.

The housing top part 58 and the housing bottom part 60 are screwed together by means of a total of thirteen connection screws 62. Overall, the housing 56 has a T-shaped cross section which extends in parallel with the suction side 54, the cross section or the housing 56 having a bar section 64 and a web section 66 which extends transversely or perpendicularly to said bar section 64. The web section 66 is in this case designed such that, as can clearly be seen in FIG. 5, it extends between a positive pole 68 and a negative pole 70 of the starter battery 26 when said starter battery 26 is picked up by suction on the battery gripper 12, such that the starter battery 26 is prevented from short-circuiting.

For positioning the battery gripper 12 on a starter battery 26, the housing 56 comprises a marker (not shown in the figures) for the positive pole 68 of the starter battery 26. The housing 56 also comprises a centre marker 74 on a periphery lateral face 72 in the region of a gripper centre on the web section 66. Moreover, the housing 56 comprises a centre marker 76 on the side of the bar section 64 that faces away from the web section 66 in the region of the gripper centre, which marker can be seen in FIG. 4.

In order to be able to make it as simple as possible to position the battery gripper 12, a stop section 78 is also provided in the region of the gripper centre on the web section 66, which stop section projects from the suction side 54. Two stop sections 80 which are laterally reversed in relation to a mirror plane of symmetry are also provided eccentrically on the side of the bar section 64 that faces away from the web section 66, which stop sections also project from the suction side 54.

A flexible lining in the form of a foam layer 82 is arranged on the suction side 54 and contacts the starter battery 26. The foam layer 82 is selected for the flexible lining because foam conforms effectively to the sometimes uneven top face 52 of the battery.

As can be seen in particular in FIGS. 7 and 8, the housing 56 comprises, in the suction side 54, suction openings 84 having a first opening cross section and suction openings 86 having a second opening cross section. The first opening cross section of the suction openings 84 is in this case smaller than the opening cross section of the suction openings 86. These suction openings 84, 86 lead into cylindrical recesses 88, 90 in the foam layer 82. The recesses 88, 90 pass through the foam layer 82 completely, the recesses 88 having a circular base and the recesses 90 having an oblong base. The oblong base of the recesses 90 is in this case larger than the circular base of the recesses 88. In the case of the recesses 88 having a circular base, each recess 88 is assigned a suction opening 84 which has the first opening cross section and is arranged coaxially with the circular base of the recess 88.

In the case of the recesses 90 having an oblong base, each recess 90 is assigned two suction openings 86 which have the second opening cross section and are arranged, respectively, in the semicircular end regions of the oblong base of the recesses 90.

As can be seen in FIG. 7, the suction side 54 has three suction sections 92, 94, 96 in the direction of the bar section 64. A middle suction section 92 is provided in the middle of the suction side 54, two end suction sections 94, 96 being arranged outside the middle suction section 92. In the middle suction section 92, there are provided approximately the same number of suction openings 84, 86 having the first and the second opening cross section, a corresponding number of recesses 88 having a circular base and recesses 90 having an oblong base also being provided. In the end suction sections 94, 96, there are arranged only suction openings 86 having the second opening cross section and recesses 90 having the oblong base.

As can be seen in particular in the view from below according to FIG. 8, the middle suction section 92 is further divided into a central suction section 98 and two transition suction sections 100, 102 adjoining the end suction sections 94, 96. In the region of the central suction section 98, there are arranged only suction openings 84 having the first opening cross section and recesses 88 having a circular base, whereas in the transition suction sections 100, 102, there are arranged only or predominantly suction openings 86 having the second opening cross section and recesses 90 having the oblong base.

Furthermore, the suction side 54 comprises an edge suction section 104, indicated by a dashed line in FIG. 8, there being arranged in the edge suction section 104 only or predominantly suction openings 84 having the first opening cross section and recesses 88 having the circular base.

The suction openings 84, 86 and the recesses 88, 90 are arranged in this case such that they can be adapted to the top face 52 of a battery such that, in uneven sections on the top face 52 of the battery, suction openings 84 having the smaller first opening cross section and recesses 88 having the smaller circular base are provided, whereas, in flat sections on the top face 52 of the battery, suction openings 86 having the larger second opening cross section and recesses 90 having the larger oblong base are provided, such that leakage caused by the top face of the battery being uneven can be minimised.

The invention claimed is:

1. Battery gripper for picking up by suction and handling starter batteries, comprising a housing in which a vacuum chamber to which a vacuum can be applied is provided and which comprises suction openings on the suction side thereof that faces the starter battery to be picked up by suction, wherein the suction side is associated with a flexible lining for contacting the starter battery, wherein the suction side and/or the flexible lining has a T-shaped cross section, wherein the cross section has a bar section and a web section which extends transversely to said bar section such that the web section extends between the battery poles of the starter battery when said starter battery is picked up by suction on the battery gripper, wherein suction openings are provided with at least two different opening cross sections, a first opening cross section being smaller than a second opening cross section, wherein the suction side has three suction sections in the direction of the bar section, there being arranged in a middle suction section approximately the same number of suction openings having the first and second opening cross section, and there being arranged in two end suction sections arranged outside the middle suction section at least a majority of suction openings having the second opening cross section.

2. Battery gripper according to claim 1, characterised in that the suction openings are designed such that the number, opening cross section and/or geometry thereof is adapted to a battery surface of a starter battery to be picked up by suction.

3. Battery gripper according to claim 1, characterised in that the middle suction section has a central suction section, there being arranged in the central suction section only suction openings having the first opening cross section, and the middle suction section having, next to the central suction section, two transition suction sections which adjoin the end suction sections, there being arranged in the transition suction sections only or predominantly suction openings having the second opening cross section.

4. Battery gripper according to claim 1, characterised in that the suction side has a peripheral edge suction section, there being arranged in the edge suction section only or predominantly suction openings having the first opening cross section.

5. Battery gripper according to claim 1, characterised in that cylindrical recesses are provided in the flexible lining, which pass through the flexible lining, the suction openings leading into the recesses, and the size of the recesses corresponding to the size of the suction openings.

6. Battery gripper according to claim 5, characterised in that the recesses are designed such that the number, base, geometry and/or depth thereof is adapted to a battery surface of a starter battery to be picked up by suction.

7. Battery gripper according to claim 5, characterised in that the cylindrical recesses have a circular or oblong base area.

8. Battery gripper according to claim 1, characterised in that the battery gripper has a coupling section for connection to a tube lifter, the coupling section comprising an opening which leads into the vacuum chamber, and the coupling section comprising lock studs arranged evenly around the opening.

9. Battery gripper according to claim 1, characterised in that the flexible lining is a foam lining.

10. Battery gripper according to claim 1, characterised in that the housing has centre markers on the lateral face thereof in the region of the web section and on the side of the bar section that faces away from the web section.

11. Battery gripper according to claim 10, characterised in that stop sections which project from the suction side are provided on the lateral face.

12. Gripping system comprising a tube lifter, an operating device for the tube lifter, at least a first vacuum source and a battery gripper for picking up by suction and handling starter batteries, comprising a housing in which a vacuum chamber to which a vacuum can be applied is provided and which comprises suction openings on the suction side thereof that faces the starter battery to be picked up by suction, wherein the suction side is associated with a flexible lining for contacting the starter battery, wherein the suction side and/or the flexible lining has a T-shaped cross section, wherein the cross section has a bar section and a web section which extends transversely to said bar section such that the web section extends between the battery poles of the starter battery when said starter battery is picked up by suction on the battery gripper, wherein suction openings are provided with at least two different opening cross sections, a first opening cross section being smaller than a second opening cross section, wherein the suction side has three suction sections in the direction of the bar section, there being arranged in a middle suction section approximately the same number of suction openings having the first and second opening cross section, and there being arranged in two end suction sections arranged outside the middle suction section at least a majority suction openings having the second opening cross section, wherein the first vacuum source is fluidically connected to the tube lifter.

13. Gripping system according to claim 12, characterised in that the first vacuum source is fluidically connected to the battery gripper.

* * * * *